United States Patent [19]

Franklin

[11] Patent Number: 5,240,022
[45] Date of Patent: Aug. 31, 1993

[54] AUTOMATIC SHUTOFF VALVE

[76] Inventor: Robert C. Franklin, 59 N. Santa Cruz Ave., Ste. W, Los Gatos, Calif. 95030

[21] Appl. No.: 771,452

[22] Filed: Oct. 3, 1991

[51] Int. Cl.⁵ .................. G08B 21/00; F16K 31/02
[52] U.S. Cl. ........................................ 137/1; 137/78.1; 137/312; 137/551; 340/605; 340/636
[58] Field of Search ............... 137/1, 78.1, 312, 551; 340/605, 636

[56] References Cited

U.S. PATENT DOCUMENTS 4,297,686 10/1981 Tom .............................. 137/78.1 X
4,324,268 4/1982 Jacobson ............................ 137/312

Primary Examiner—Robert G. Nilson
Attorney, Agent, or Firm—Skjerven, Morrill, MacPherson, Franklin and Friel

[57] ABSTRACT

An automatic shutoff valve system for installation for instance in the water supply line to a hot water heater includes a sensor to detect leakage electrically by sensing moisture, and then shutting off the supply line in response. The valve mechanism includes a spring loaded ball valve normally latched in the open position which is unlatched and hence closes by the contraction of a BioMetal TM wire which activates a torsion spring to rotate the ball valve. The valve is controlled by a microprocessor which includes self test features, and the valve system may operate for a year or more on battery power.

14 Claims, 10 Drawing Sheets

Microfiche Appendix Included
(1 Microfiche, 24 Pages)

AUTOMATIC SHUTOFF VALVE

MICROFICHE APPENDIX

This disclosure includes a Microfiche Appendix having a total of 24 frames on 1 fiche and showing a computer program.

BACKGROUND OF INVENTION

1. Field of the Invention

This invention relates to an electronically controlled valve which senses a leakage of water or other conductive fluid, and shuts off the source of leakage before extensive structural or property damage can occur. By utilizing a microcontroller-based system in conjunction with a novel valve mechanism, this automatic shutoff valve provides a cost-effective system suitable for various household and commercial applications.

2. Description of the Prior Art

There are situations in which no one is present to hear an alarm when a water leak occurs. Broken water lines on water heaters have been responsible for extensive property damage, especially as a result of earthquakes. In the case of automatic dishwashers and clothes washers the breakage of input water hoses or faulty water level sensing switches has also been known to cause extensive property damage.

There are existing devices, such as the "Water Alert TM " manufactured by Dorlen Products, which provide an audible alarm when the presence of water is detected thus alerting an individual that immediate attention is required. This provides no protection if no one is present at the time the alarm sounds.

Another commercially available system is the "Fluid Guard," manufactured by Fluid Guard Incorporated. This system detects a water leak condition by monitoring the volume of water flow versus time. It has several disadvantages such as a somewhat complex plumbing installation, need for sensitivity and time adjustments, and high cost.

Yet another device is described in U.S. Pat. No. 4,324,268, dated Apr. 13, 1982, and issued to Avram A. Jacobson. Jacobson utilizes a transistor to sense the presence of liquid via a resulting base-to-emitter current. This current causes transistor collector current to flow which is directly drives a latching relay. The relay, when latched on, energizes a solenoid which, in turn, closes the water valve thus shutting off water flow. The system is powered by a rectified AC power source which is isolated from the AC mains by a transformer. While the function of this valve system is apparent, there are several disadvantages. First, if there is a power failure either during or after the valve closure due to a water leak condition, the valve will once again open allowing the water leak to continue. Although Jacobson states that a battery power source can be provided, it is also mentioned that the solenoid coil will produce sufficient heat during extended periods of energization to warrant its location away from the electronic components. With this in mind, it would require a battery of sizable capacity to maintain the valve in a closed condition for long periods of time. Next, while a remote test switch is provided to simulate the presence of a water leak, and thus induce a valve closure, the switch must periodically be manually activated to test the system. This requirement in all likelihood would very seldom, if ever, be performed, thus compromising system reliability. Lastly, the test switch simulates a water leak condition by effectively placing a resistance across the sensing transistor input lines which are physically located within the control circuit enclosure. Such a circuit configuration fails to test for breakage of either or both of the moisture probe connecting wires which would render the system ineffective. Activating the test switch would indicate the system is operating properly in spite of such a failure.

SUMMARY OF THE INVENTION

This invention provides a leak detection and shutoff valve system which overcomes the disadvantages of prior art devices. This valve system has the advantage of both turning off water flow and providing an audible and visual alarm rather than just sounding a warning, as is the case with many commercially available devices. In one embodiment a spring-loaded ball valve is normally latched in an open condition thus allowing unimpeded water flow. The valve latch mechanism holds the valve in the open condition until it is unlatched through the action of a BioMetal TM wire which contracts in length when heated by the passage of electrical current through the wire. Unlatching the latch mechanism allows a torsion spring to apply sufficient torque to the ball portion of the valve to rotate it 90 degrees to a closed position thus shutting off water flow. The ball valve allows rotation with minimal friction until the closed position is reached, at which time the ball firmly seats against a sealing 0-ring.

The valve assembly is connected to a control module via a multi-wire cable. The control module contains a low-power 4-bit microcontroller which has a resident program to provide the necessary logic and control functions. Moisture detection is accomplished by a well known method of allowing the presence of a conducting liquid to increase the current and/or voltage to a transistor or logic gate. The transistor method is used in one embodiment to provide a protective buffer between the sensing probe circuit and the $\mu$C input. The leak detection module includes two metallic probes which are connected to the control module via a four-wire cable. Each leak detection module also contains a jumper arrangement to allow connecting additional detection modules in a series/parallel circuit.

The control module housing can be mounted on a wall location adjacent to the valve. The control module also includes a light-emitting diode (LED) and piezo-electric transducer to provide visible and audible alarm functions respectively. A power switch applies D.C. power to the various circuits. A valve selector switch allows the control module to control one or two water valves. Two valve operation might be found in situations such as a clothes washer where both hot and cold water are independently supplied to the appliance. A push button switch activates the valve shutoff by pressing the switch button for a prescribed time interval, for example 3 seconds. In addition, this switch delays the alarm condition until a more convenient time. For example, if a leak condition occurred at 2 A.M. and the valve has successfully shut off the leak condition, the resulting audible alarm could prove to be an annoyance. To solve this problem a feature is included by which each momentary closure of the pushbutton switch adds a one hour delay until alarm restoration, up to a limit of 10 hours. Thus, pressing the pushbutton switch seven times would cause the alarm to be reactivated after a seven hour delay.

In addition, an optional AC adapter power source can be connected to the control module thereby permitting it to operate without battery drain. This also permits the use of rechargeable batteries or primary batteries as a backup power source.

The second embodiment provides the same valve shutoff function but substitutes an alternate means of connecting additional leak detection modules to the control module. There may be situations in which adding leak detection modules via additional wire cabling, as in the first embodiment, would be inconvenient. The second embodiment modifies the control module such that it will not only monitor one or more wired leak detection modules and trip the water shutoff valve(s) as previously described, but also includes a receiver circuit either connected to the AC main supply lines or which is a radio frequency receiver unit. In either case this allows the control module to receive encoded signals from special leak detection transmitter modules and to trip the shutoff valve if the appropriate signal is received.

One advantage in accordance with this invention is achieved by use of a low-power microcontroller (hereafter referred to as a $\mu$C) to provide moisture detection, valve closure drive signals, alarm drive signals, and various other logic functions as described later. By using low power consuming circuitry the valve system is capable of operating on battery power for periods in excess of a year, thus not only providing battery backup in the event of AC mains power failure, but also allowing operation of the valve system in locations where mains power is either not available or difficult to provide. The $\mu$C also continuously tests for system malfunctions and alerts an individual of such conditions.

DESCRIPTION OF THE DRAWINGS

FIG. 5A' is an insert view of FIG. 5A.

DETAILED DESCRIPTION

The following description is of two embodiments of the mechanical and electronic aspects of this invention but does not preclude other embodiments which would be apparent to one skilled in the art.

Figure 1:
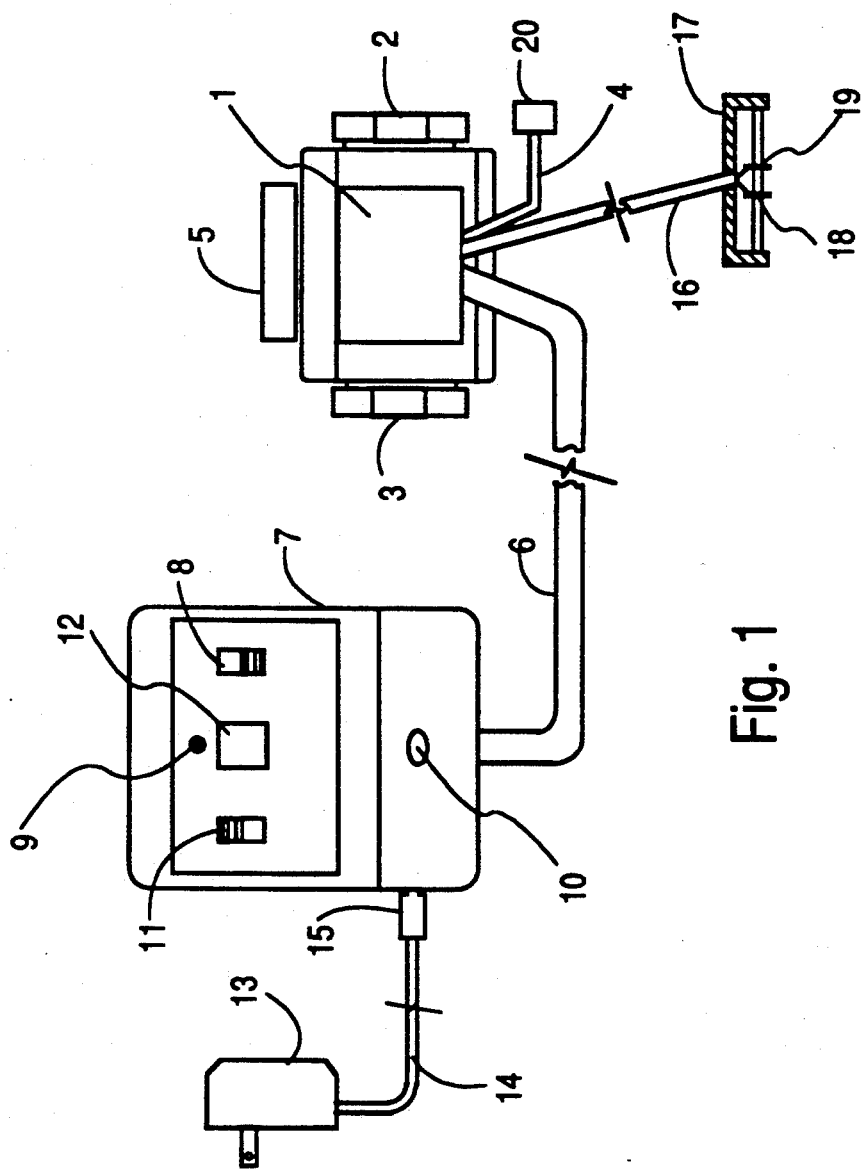
FIG. 1 shows a hard-wired embodiment of the automatic shutoff valve system.

FIG. 1 is a view of a hard-wired embodiment of the automatic shutoff valve system. The water shutoff valve 1 includes conventional pipe fittings 2 and 3 and a valve re-latch knob 5. Multi-conductor cable 6 provides the necessary electrical connections between the valve 1 and the control module 7. Slide switch 8 provides a power on-off function. LED 9 is a visual indicator of both normal operation and alarm conditions. Aperture 10 allows transmission of sound from an internal piezoelectric alarm transducer described below. Slide switch 11 provides selection between one or two valve operation, as might be the case in hot and cold water applications. Pushbutton switch 12 provides the double function as both a valve trip-test activation means and an alarm delay means. AC power adapter 13 is a line-isolation low voltage D.C. power and battery charging source for the control module 7. Cable 14 and plug 15 are the connections between the adapter 13 and the control module 7. Wire cable 16 is the signal line connections between the control module 7, via cable 6 and water shutoff valve 1, and the leak detection module 17. The cutaway drawing of the module 17 displays the two probes 18 and 19 which, when placed in contact with a conducting liquid, function to produce a liquid leakage signal to the appropriate circuits in the control module 7. Connector 20 connects to an additional water shutoff valve as explained below.

Figure 2:
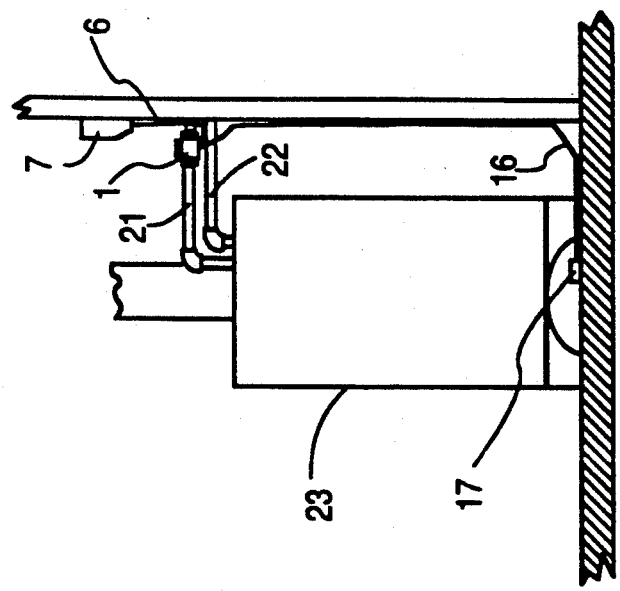
FIG. 2 shows a typical installation of the automatic shutoff valve system for a hot water heater.

FIG. 2 shows a typical hot water heater installation incorporating a water shutoff valve system. Water shutoff valve 1 is installed in the cold water input pipe 21 of water heater 23. Water pipe 22 is the hot water outlet for distribution to the faucets, etc. Control module 7 is shown mounted on the wall adjacent to the valve 1 and connected to the valve via cable 6. Leak detection module 17 is located under the water heater 23, with cable 16 providing the necessary interconnection means.

Figure 3:
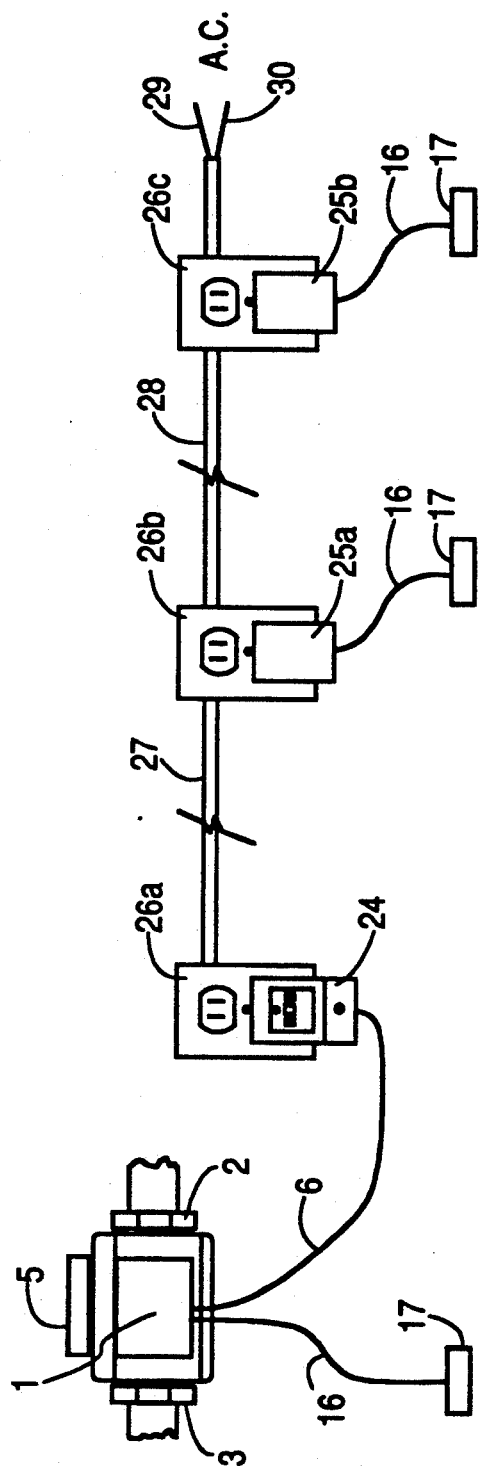
FIG. 3 shows an AC power line interconnection as another embodiment of the automatic shutoff valve system.

FIG. 3 shows an alternate embodiment of the water shutoff valve system in which an AC line-carrier provides leak detection signals to the master control module 24. Line-carrier systems are well known and commonly used in such applications as home intercoms and remote lamp/appliance controls. This embodiment permits additional leak detection modules to be placed in remote locations which are not easily connected to the control module 7 via wires. Thus, a water shutoff valve can be installed in a main water supply line and controlled by numerous remote leak detection modules. Water shutoff valve 1 is shown connected to leak detection module 17 via cable 16 as previously described. Cable 6 again provides connection between valve 1 and the master control module 24. Master control module 24 is a modified version of control module 7 and receives leak detection signals from the slave modules 25a and 25b using the line-carrier method. The master control module 24 and slave modules 25a and 25b are shown plugged into standard wall outlet boxes 26a, 26b, and 26c respectively. Wires 29 and 30 provide the normal source of alternating current as would be found in a standard wiring installation. Each of the slave modules has its own leak detection module 17 connected via cable 16. If slave module 25a and/or 25b were to detect a water leakage an encoded signal would be transmitted via the AC power lines 27 and 28 to the master control module 24. Upon receiving such a signal, master control module 24 would initiate a normal valve shutoff and alarm procedure. Although this embodiment description utilizes a line-carrier system it should be recognized that a radio-frequency system may be substituted.

Figure 4:
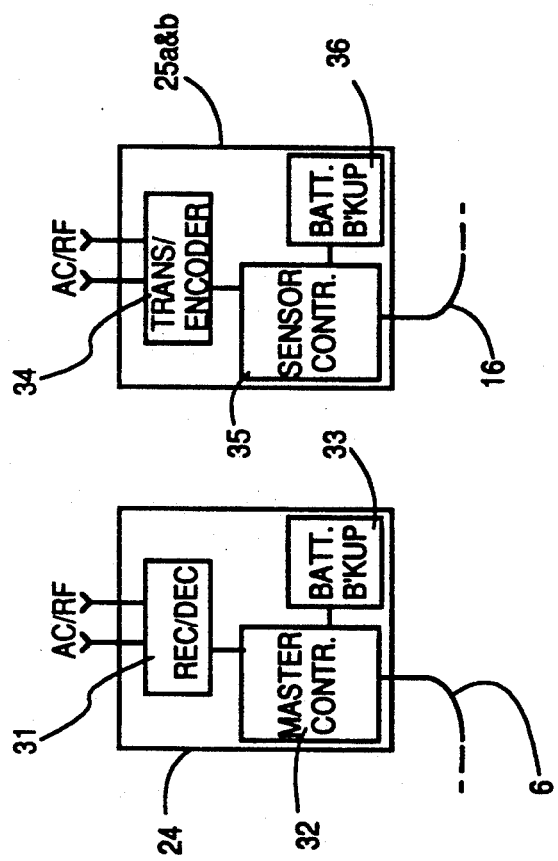
FIG. 4 shows in more detail the transmitter and receiver modules of FIG. 3.

FIG. 4 is a more detailed block diagram of the internal circuits of the master control module 24 and slave modules 25a and 25b. Master control module 24 contains a receiver/decoder circuit 31 which may receive either radio frequency signals or AC line-carrier signals and route the amplified and decoded signals to the master control circuit 32. The output from master control circuit 32 is routed via cable 6 as previously described and functions in a manner similar to the control module 7. The battery backup circuit 33 functions to supply power to the receiver and master control circuits if primary AC power fails.

Slave modules 25a and 25b contain a sensor control circuit 35 which receives its input from the leak detection module via line 16 as previously described. Any water leakage signal is sent to the transmitter/encoder 34 which encodes the signal to be compatible with the code setting of the master control module 24. Such encoding is necessary to reduce the possibility of initiating a water valve shutoff based on extraneous signals or signals from other water shutoff systems. The encoded signals are now sent via the AC power lines or radio frequency as previously described. Again, the battery backup circuit 36 functions to supply power to circuits 34 and 35 in the event of a failure of primary AC power.

Figure 5A:
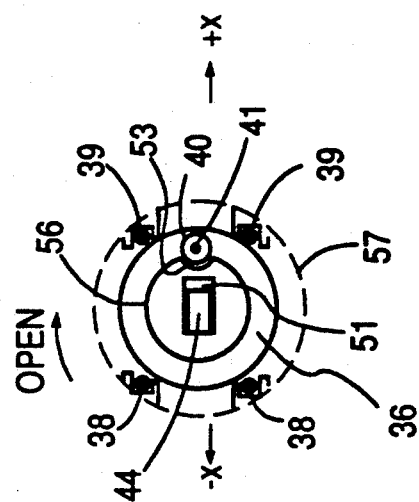
FIG. 5A is a cross-sectional view of the water shutoff valve.
Figure 5A:
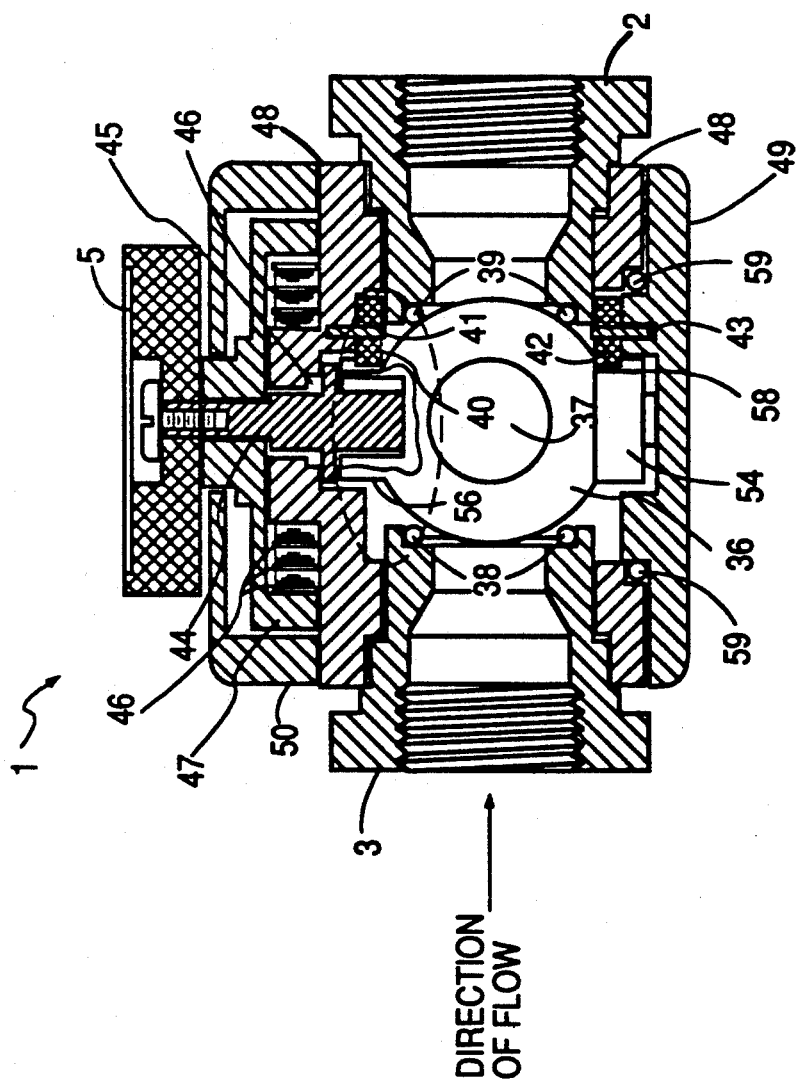

FIG. 5A is a cross-sectional view of the water shutoff valve 1. Valve 1 is a spring-loaded ball valve which permits changing its flow status from ON to OFF or vice versa by rotating the ball through 90 degrees. The valve is shown in a closed condition with valve ball 36 pressing against the 0-ring seal 39, thus preventing fluid flow through the pipe fitting and input port 3 to the pipe fitting and output port 2. Through-hole 37 in valve ball 36 provides the path for fluid flow when the valve ball 36 is rotated 90 degrees.

One major problem encountered in prior art ball valves or plug valves pertains to the high rotational forces required to change the fluid flow condition from ON to OFF or vice versa. The high rotational forces are primarily due to the friction between the valve ball and the 0-ring seals. This friction becomes more pronounced as the lubricants, normally applied during valve manufacturing, become sticky or hard as they age.

To minimize these friction forces, in accordance with the invention, a novel ball rotation system is used which allows the valve ball 36 to rotate with a small clearance or very slight contact between itself and the 0-rings 38 and 39 when in the valve open condition, to prevent contamination particles from entering the valve mechanism. Rollers 40 and 42 which rotate on pins 41 and 43 respectively reduce friction. Roller 40 normally rides on the upper collar surface 56 of valve ball 36 during the open valve portion of rotation. Likewise, roller 42 rides on the lower collar surface 54. In this valve open condition the valve ball lightly touches the 0-rings 38 and 39 as previously stated.

The valve-closed condition is more easily understood by the insert view 57 (FIG. 5A') of FIG. 5A. In this view the top portion of the valve ball is shown rotated to produce a top view of the valve ball 36. While this inserted view shows the top of valve ball 36 and roller 40, it should be understood that a bottom view would similarly show the valve ball collar 54 and associated roller 42. Again referring to the insert view 57, observe that, in the position shown, roller 40 is resting in detent 53 of the valve ball collar 56 and, while not shown, bottom roller 42 rests in detent 58. This allows the surface of valve ball 36 to press against O-ring 39 due to the resulting inlet water pressure. Although not shown, spring pressure could be provided to ensure ball valve 36 closure against O-ring 39 in the event of low water pressure. This could be accomplished using spring-loaded rollers, or the equivalent, pressing against the water inlet side of valve ball collars 56 and 54. Also note that to allow valve ball 36 to move in a +X direction, the bottom, rectangular end of shaft 44 fits into rectangular slot 51.

To reset the valve to an open condition, knob 5 must be rotated in a clockwise direction as viewed from the top of valve 1. Shaft 44 couples the rotational torque from knob 5 to valve ball 36. O-ring 45 seals against fluid leakage. Once again referring to insert view 57 it can be seen that a clockwise rotation of valve ball 36 causes the outer diameter of upper collar 56 to engage roller 40 in a manner which produces a movement of valve ball 36 in a −X direction. The outer diameter of lower collar 54 likewise engages roller 42. Once knob 5, shaft 44, rotor 47, and valve ball 36 are rotated 90 degrees to a latched, valve open position there is little if any frictional contact between the valve ball 36 surface and O-ring 39.

Bottom cover 49 provides access to the inner cavity of valve body 48 to facilitate assembly. O-ring 59 seals against fluid leakage. Top cover 50 encloses the rotor 47.

Figure 5B:
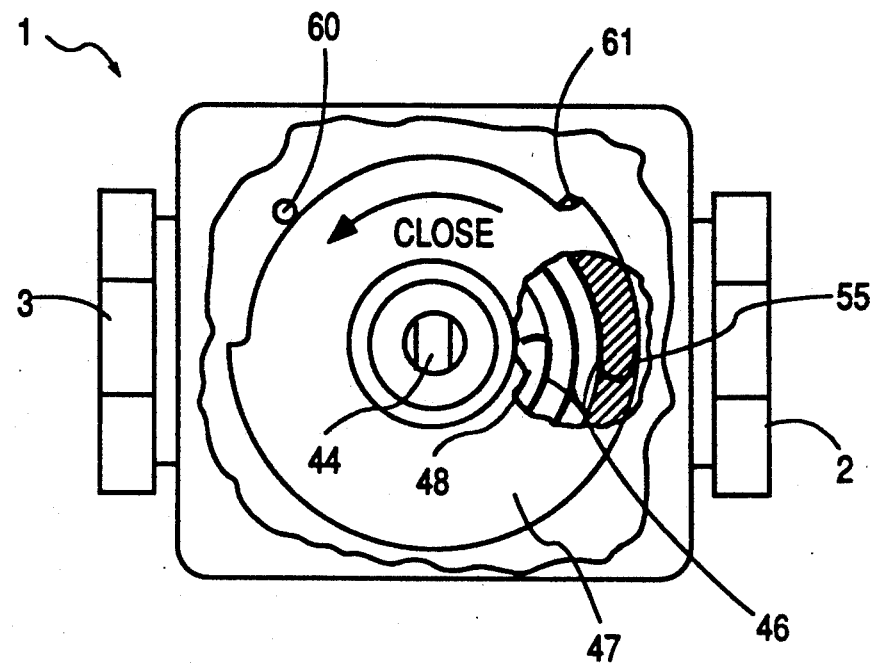
FIG. 5B is a top view of the water shutoff valve with cutaway views.

FIG. 5B is a top view of water shutoff valve 1 showing cutaway views of the rotor 47 and torsion spring 46 locations. Rotor 47 is now shown in a position representing a valve-open condition. The inner coil of torsion spring 46 is shown attached to the hub portion of valve body 48. The outer spring coil is attached to the rotor 47 using a hook arrangement at point 55. Spring 46 is now exerting a counterclockwise torque on rotor 47. The rotor is now locked in a valve-open position by the valve latching mechanism to be described later. When the valve latching mechanism releases the rotor 47 to rotate in a counterclockwise direction in order to establish a valve-closed condition, the amount of rotation is restricted to 90 degrees when rotor surface 61 hits the stop pin 60. Because rotor 47 is physically attached to shaft 44 the valve ball 36 will likewise be placed in a valve-closed condition as previously described in conjunction with FIG. 5A.

Figure 5C:
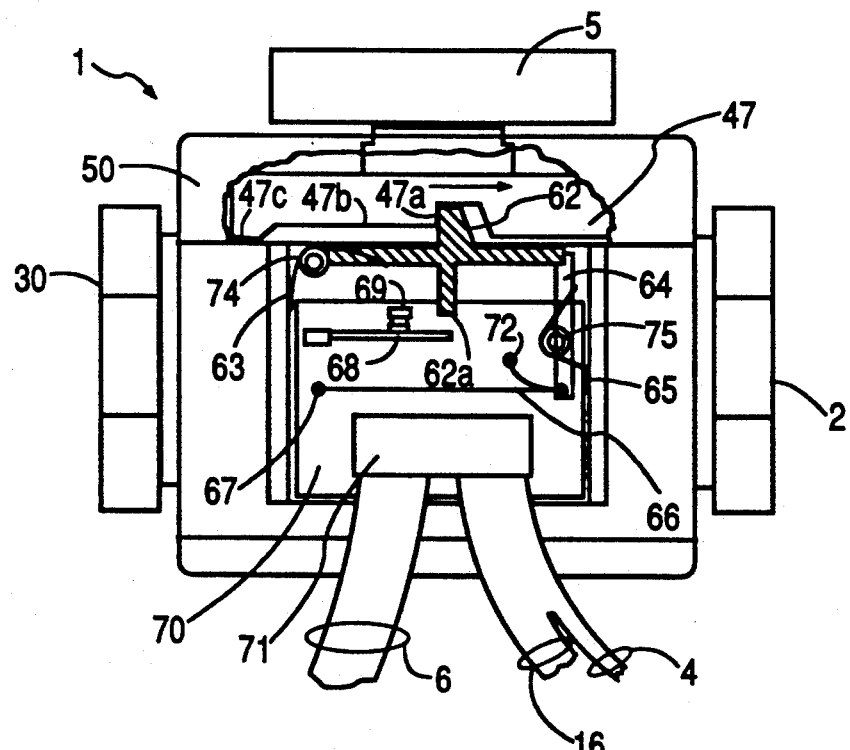
FIG. 5C is a side view of the water shutoff valve to illustrate the latch mechanism.

FIG. 5C shows a cutaway view of the latch mechanism used to hold the valve in an open condition until a valve closure is required. Latching arm 62 engages rotor 47 at surface 47a in order to prevent any rotor movement. Latching arm 62 is pinned at point 74 and would normally rotate in a clockwise direction about that point due to the rotational moment impressed on the latching arm by rotor 47. However, the end of latching arm 62 contacts the lip of trip arm 64 in a manner which does not permit any rotation of the latching arm. Trip arm 64 rotates about point 75 and it receives a counterclockwise retaining torque from wire spring 65 which also holds trip wire 66 in a taut condition.

Trip wire 66 is a special shape memory alloy, metallic wire marketed under the name BioMetal TM by Mondotronics, Inc., Sunnyvale, Calif., which has the property of contracting in length when heated to a specific temperature. The method of heating involves passing an electrical current, on the order of 400 milliamperes, through the wire. Trip wire 66 is fastened at one end to mounting terminal 67 which, in turn, is fastened to printed circuit board 70. The other end of the trip wire is fastened to the bottom of trip arm 64 with a short extension to terminal 72 which provides a necessary electrical connection to printed circuit board 70.

To initiate a valve-closed condition the following chain of events takes place. First, the necessary drive signal from the previously mentioned control module 7 produces a heating current in trip wire 66, thus causing it to contract in length. The resulting force on the lower end of trip arm 64 causes the trip arm to rotate in a clockwise direction about point 75. The top end of trip arm 64 now moves a sufficient distance to release the end of latch arm 62. Latch arm 62 now rotates in a clockwise direction under the pressure of the rotor 47 which easily overcomes the retaining torque of wire spring 63. As rotor 47 rotates toward a valve-closed condition, the tip of latch arm 62 rides in contact with surface 47b. Once the rotor 47, and hence the valve ball 36 have rotated to a valve-closed condition, the tip of latch arm 62 rides in contact with surface 47c. At this position, point 62a of latch arm 62 contacts leaf-spring switch 68 causing its electrical contact to separate from the circuit board mounted contact 69. Had a mechanical malfunction occurred which might cause the valve to jam before it could reach a fully closed condition, the tip of latch arm 62 would not reach the surface 47c and switch 68, 69 contacts would not open. As will be seen later this information is used by the μC software to produce an urgent attention alarm to alert people that a malfunction has occurred. It should also be noted that connector 71 is mounted to printed circuit board 70 to provide the necessary signal routing and interconnection for cables 6, 16, and 4.

Figure 6:
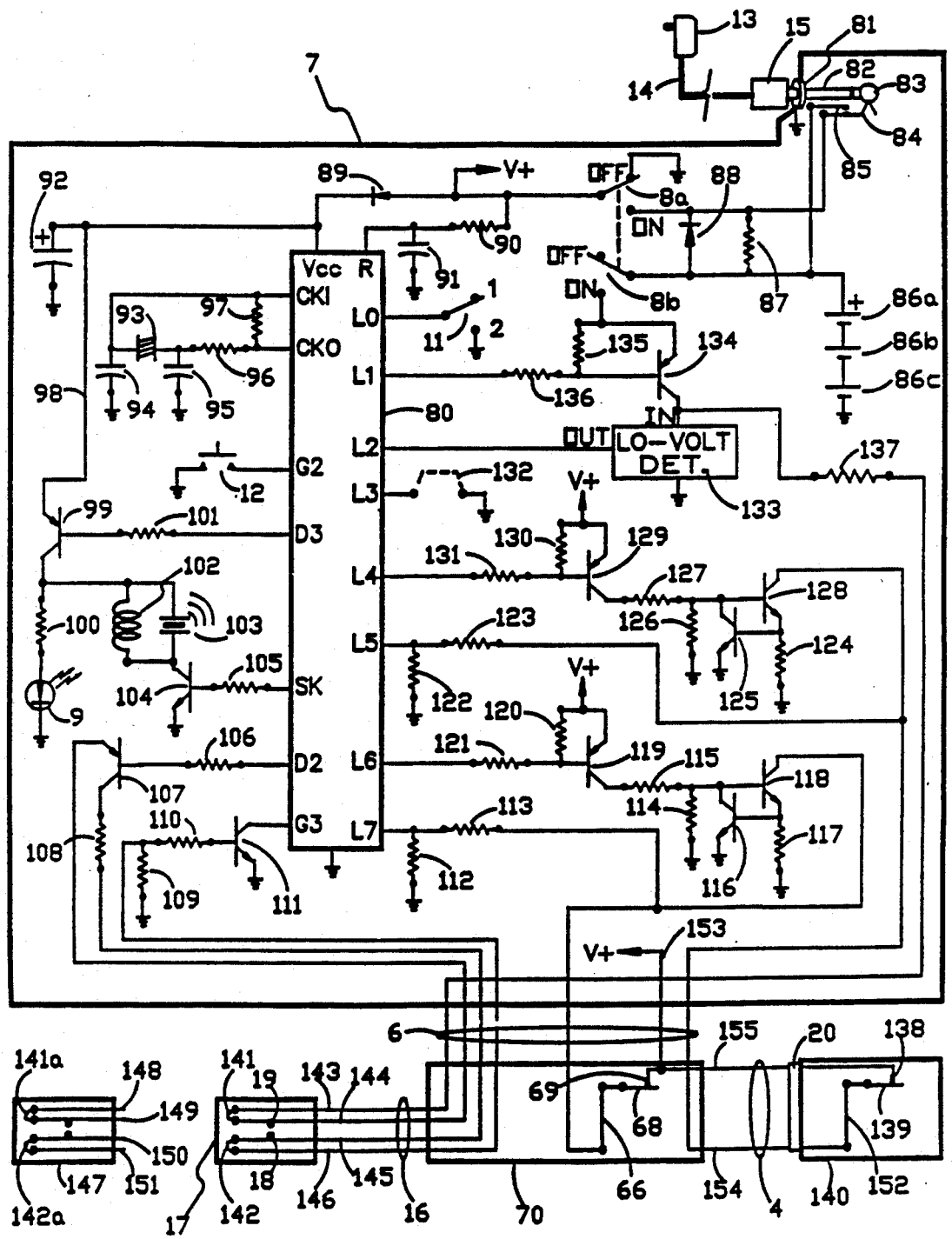
FIG. 6 is a schematic diagram of the electronic circuitry in accordance with this invention.

The following description is only of the hard-wired embodiment of the automatic shutoff valve system because this includes the elements necessary for operation. It is understood that an AC line-carrier or RF system may be adapted from this hard-wired system by one skilled in the art. FIG. 6 is a schematic diagram of the circuitry used in conjunction with the automatic shutoff valve system. A key element of the electronic circuitry is the μC 80. Although numerous commercially available microcontrollers could be used, the COP-426C, manufactured by National Semiconductor Corporation was chosen. It is a 4-bit μC which is a low-power and cost effective means to attain the objectives.

Beginning with the power supply circuitry, the optional AC power adapter 13 and its associated cable 14 and plug 15 are shown attached. The receptacle into which plug 15 is inserted is comprised of grounding collar 81, spring contact 84, and mating contact 85. The grounding collar 81 makes contact with the negative terminal 82 of plug 15, and the inverted-V portion of spring contact 84 makes contact with the tip 83 of plug 15 which is at a positive potential of about 4.5 volts DC. With plug 15 inserted, spring contact 84 and mating contact 85 are separated thereby removing the shorting path across resistor 87 and diode 88. Resistor 87 is used as a current limiting resistance in the charging path for rechargeable batteries 86a, b, and c. Diode 88 provides a low impedance current path around resistor 87 in the situation where the AC adapter is installed but a primary AC power failure has taken place. If rechargeable batteries such as the standard 1.25 volt AA size Ni-Cad type are used they will be trickle-charged by the AC adapter to provide backup power in the event of a primary AC power failure. If non-rechargeable batteries such as a 1.5 volt AA size alkaline type are used as components 86a, b, and c, the voltage across resistor 87 would be essentially zero and no undesirable charging current would result. As an alternate arrangement a switch could be used to disconnect resistor 87 if non-rechargeable batteries were used.

For the purpose of explanation assume that the AC adapter 13 is being used and the circuit is as shown with rechargeable batteries installed in 86a, b, and c. Power switch 8 includes two sections 8a and 8b. When the contacts of section 8a are placed in the ON position, voltage is applied to diode 89, resistor 90, and terminal V+, from which it is distributed to the three load terminals also labeled V+. Diode 89 is a unidirectional current path to the Vcc terminal of μC 80, filter capacitor 92, and alarm driver transistor 99. Diode 89 allows capacitor 92 to filter supply voltage fluctuations to the μC 80 when large current loads are placed on the batteries during valve trip activation.

When voltage is first applied to resistor 90, capacitor 91 begins charging toward the supply voltage. The μC 80 internal circuits utilize this delayed voltage application at the 'R' terminal to initialize itself to a reset state, before proceeding to execute the resident program. When the contacts of switch section 8b are also closed in an ON position, voltage is applied to pull-up resistor 135 and the emitter of PNP transistor 134. Under software control μC 80 terminal L1, which is normally high, is driven low in order to allow emitter to base current to flow, thereby switching transistor 134 to a conductive state. Nearly the full battery voltage is now impressed across the low voltage detector 133 to ground. In addition the battery voltage applied to resistor 137 for leak detection purposes is explained below. Voltage detector 133 is an integrated circuit containing a voltage reference and comparator to determine when the voltage, applied between its input terminal and ground, drops below a prescribed value. An example of such an integrated circuit is a model S-8053ANO, manufactured by Seiko Instruments Inc. Normally the output terminal of voltage detector 133 is high, but will switch to a low state when the battery voltage drops below approximately 3.6 volts. During the time at which the battery voltage testing is performed (terminal L1 is low), μC terminal L2 status is determined. If a low battery condition exists, the output of voltage detector 133 will hold terminal L2 low which will result in the software program initiating a low battery warning to be described later in detail.

Connected to μC 80 terminals CK1 and CKO is a clock oscillator circuit comprised of a 32.768 Khz crystal 93, resistors 96, 97, and capacitors 94, 95. These components, in conjunction with the μC internal circuitry, produce a master clock signal which μC 80 uses to perform various timing and control functions.

Switch 12, as previously described, performs a dual function. Terminal G2 of μC 80 is periodically sampled under program control to determine the open or closed status of switch 12. If the shutoff valve system is in a non-alarm mode (there has been no leak detection), holding switch 12 closed for a period of 3 seconds will cause the μC program to initiate a valve closure, typically for test purposes. If, however, the shutoff valve system is in an alarm mode, the momentary closure of switch 12 causes the μC program to inhibit the visible and audible alarm signals and delay their reactivation for one hour. Each momentary closure of switch 12 adds one more hour delay, up to a maximum of 10 hours. In addition, a short audible beep and visual blink are produced after each switch reopening to provide a sensory feedback confirmation that an hour delay has indeed been added. When repeated switch closures have established a maximum ten hour delay, the next momentary closure of switch 12 causes a return to a zero delay condition. To provide a distinct sensory feedback confirmation that the zero delay condition has been reestablished, a longer duration audible beep and visual blink are produced. The above sensory signals are produced by piezoelectric transducer 103 and LED 9 whose drive circuits include transistors 99 and 104, resistors 100, 101, and 105, and inductor 102. During normal, non-alarm conditions LED 9 will blink once each minute to provide an indication that the system is operating. This minimizes battery drain during battery only operation. When terminal D3 of μC 80 (which is normally high) is driven low under program control, a forward biasing current flows from the positive potential at line 98 through the emitter-base junction of PNP transistor 99, and through resistor 101. The resulting positive potential at the collector of transistor 99 produces the desired current through LED 9, via current limiting resistor 100. Driving terminal D3 high again extinguishes LED 9. It should be noted that when transistor 99 is conducting, its positive collector potential is not only applied to the top of resistor 100 but also to the top of inductor 102 and piezoelectric transducer 103. In the above situation, since NPN transistor 104 is not conducting, only LED 9 is independently activated. During alarm conditions it is desired to simultaneously activate both the LED 9 and piezoelectric transducer 103. To accomplish this, transistor 99 is turned on as previously described. At the same time NPN transistor 104 is switched on and off at a 2 kilohertz rate by a square wave of the same frequency made available, through program control, at the SK output terminal of μC 80. Resistor 105 limits the base-emitter biasing current during the peak positive portion of the SK square wave. The resulting 2 kiloHertz alternating potential across piezoelectric transducer 103 causes it to emit a 2 kiloHertz tone. Inductor 102 resonates with the piezoelectric transducer 103, causing a larger voltage swing to occur across the transducer 103, and thus a greater audio output than would be possible with just the transducer alone. The audible and visible alarm signals are produced in a coded format to allow differentiation between leak detection, a detectable malfunction, or a low battery condition. For example, if a water leak is detected the shutoff valve(s) is closed and a series of three blinks from LED 9 and beeps from transducer 103 is produced every 15 seconds. If a malfunction is detected, a series of two blinks and beeps are produced every 15 seconds. Likewise, if a low battery condition exists, a single blink and beep are produced every 15 seconds. Finally, as previously mentioned, a jammed valve condition requires that an urgent attention alarm be provided. When this condition is sensed, the software program causes a series of successive blinks and beeps to be produced for a period of time, say one minute, followed by a reversion to the standard alarm format to conserve battery power.

The next subject to be addressed is leak detection. Again referring to FIG. 6, and more specifically to the collector of PNP transistor 134, it was described above that driving terminal L1 of μC 80 low causes transistor 134 to conduct, thus impressing the battery voltage at the input terminal of the low voltage detector 133 and to resistor 137. Thus, the low voltage detection circuit is enabled only when necessary, conserving battery power. Applying voltage to resistor 137 to enable the leak detection circuitry only when necessary serves another purpose. It is known that applying a continuous DC potential across two metal probes (for the purpose of detecting a current flow between the two probes due to the presence of a conductive fluid) can cause a contamination of the probe surfaces and, hence, a reduction in the detection sensitivity and reliability. Certain prior art products incorporate a circuit for producing an alternating voltage between the probes to prevent such unwanted polarization and contamination. Such circuits are relatively complex in their implementation.

The method used in accordance with the current invention in contrast involves applying a DC potential across the detector probes only during the few milliseconds it takes to perform the necessary measurement, thereby making the effects of probe polarization relatively insignificant. For the purpose of description, assume that PNP transistor 134 is now conducting and a positive battery voltage is applied to resistor 137. The other end of resistor 137 exits control module 7 on wire 143 via cable 6, jumpers through printed circuit board 70 and is routed via cable 16 to the leak detector module 17. Within leak detector module 17, jumper 141 connects wire 143 to leak detector probe 19. Leak detector probe 18 connects to jumper 142, which in turn exits the leak detector module 17 on wire 146 and is routed through cable 16 to printed circuit board 70 where it jumpers back through cable 6 to control module 7. Wire 146 now connects to the junction of terminating resistor 109 and current limiting resistor 110. The above described circuit constitutes the path through which current flows if a conductive fluid is placed in contact with leak detection probes 18 and 19. If such a condition exists, the resulting current forward biases NPN transistor 111, causing it to conduct current between its collector to emitter. Terminal G3 of μC 80, under program control, periodically outputs a small current and test to determine if transistor 111 is conducting or not. If transistor 111 is conducting, it represents a leak condition and the appropriate software program action is initiated.

There is an exception made to the conduction of transistor 111 representing a leak condition. A self-test feature electronically places a large resistance across the leak detection probes 18 and 19 to simulate a fluid leak condition. Periodically, under program control, terminal D2 of μC 80, which is normally high, will be driven low and, via limiting resistor 106, will cause PNP transistor 107 to conduct. The emitter of transistor 107 is connected to leak detector probe 19 via wire 144. The collector of transistor 107 is connected to resistor 108 which has a value of about 330K ohms to simulate the conductivity of a fluid such as water. The bottom of resistor 108 is connected to leak detector probe 18 via wire 145. It can be seen, therefore, that with transistor 107 in a conductive state, resistor 108 is essentially placed across leak detector probes 18 and 19. In this test condition a current flows through the leak detection circuit and cause transistor 111 to conduct, providing there is no circuit malfunction. Any circuit failure, such as a broken wire to the leak detection module 17, causes transistor 111 to be in a non-conductive state when terminal G3 of μC 80 tests for the transistor's status. If the software program, which is expecting to find transistor 111 conducting, instead finds it not conducting it will initiate a malfunction alarm routine. It can be seen, therefore, that by adding two wires, 143 and 146, to the leak detection circuit a more failsafe testing scheme is implemented. This automatic testing method extends to any number of leak detection modules which might be added in a series/parallel configuration to leak detection module 17. For example, leak detection module 147 can be added to provide coverage of an additional area.

To add module 147 it is necessary simply to remove jumpers 141 and 142 and install them on module 147 in positions 141a and 142a. Additionally, the modules must be interconnected by attaching the wires in the following sequence; wires 148 to 143, wires 149 to 144, wires 150 to 145, and wires 151 to 146.

If a fluid leak is detected, the software program initiates a valve closure routine which involves turning on the driver circuits to activate the valve trip mechanism, or mechanisms in the case of a two valve system. There are two trip mechanism driver circuits provided in the control module 7, and the software program services one or two depending on the setting of switch 11. If switch 11 is in the '2' position the software program detects this low condition when it periodically tests the status of terminal L0 on $\mu$C 80.

Since both trip mechanism driver circuits are identical, only the circuit pertaining to valve 1 is described in detail. "Valve 1" refers to those circuits on printed circuit board 70 and "valve 2" refers to those circuits on printed circuit board 140. The normal state of terminal L6 of $\mu$C 80 is either high or tri-state (open). In this condition PNP transistor 119 is not conducting, with its emitter connected to V+ and its base also at V+, via pull-up resistor 120. To turn on current to the valve trip mechanism, terminal L6 is driven low, thus causing forward biasing current to flow from the emitter to base of transistor 119 and current limiting resistor 121. Transistor 119 now conducts current via resistor 115 to the junction of terminating resistor 114, the collector of NPN transistor 116, and the base of NPN transistor 118. Because of this transistor 118 base drive, current flows from the V+ terminal through conductor 153 to the contact 69 and its associated contact of leaf-switch 68, then through BioMetal TM wire 66 to the collector-emitter of transistor 118, and finally through resistor 117 to ground. As previously described, the current through BioMetal TM wire 66 causes it to contract in length thus tripping the valve latch mechanism. To prevent excessive current flow through the BioMetal TM wire when the supply voltage V+ is high, the voltage developed across resistor 117 forward biases NPN transistor. Thus, when the voltage across resistor 117 reaches approximately 0.6 volts (which represents about 400 milliamperes through the BioMetal TM wire) transistor 116 will begin to conduct in a manner to shunt away base drive current to transistor 118, which in turn causes a higher voltage drop between the collector to emitter of transistor 118, and a current limiting action will take place. The collector of transistor 118 is also connected to resistor 113 which in turn is connected to terminating resistor 112 and terminal L7 of $\mu$C 80. When the software program initiates a valve closure routine it also begins testing the status of the voltage at terminal L7. As long as terminal L7 is high, it indicates that the shutoff valve is still open. Once the valve closure is complete, switch 68 opens and the voltage at resistor 113 and hence the voltage at L7 drops to zero. At this point the software program removes drive current to transistor 119 by returning terminal L6 to a high state. If drive current is applied to the valve trip mechanism for more than 4 seconds without detecting a successful valve closure, the software program assumes a jammed valve condition and removes the drive current and initiates an urgent attention alarm.

Terminals L4 and L5 of $\mu$C 80 perform functions identical to terminals L6 and L7 respectively. Transistor 128 provides the drive for the valve 2 trip mechanism via conductor 154 in conjunction with the V+ voltage connected to a second valve printed circuit board 140 via conductor 155. Conductors 154 and 155 comprise cable 4 and are connected to printed circuit board 140 using connector 20. BioMetal TM wire 152 and switch components 138 and 139 perform identical functions as items 66, 69 and 68 respectively on printed circuit board 70. Finally, terminal L3 of $\mu$C 80 may be optionally grounded using jumper 132. This jumper is only used to expedite factory testing and, when installed, the software program switches several internal timers to a "quick" mode which reduces the time required to perform certain functions.

DESCRIPTION OF MICROCONTROLLER SOFTWARE

The $\mu$C 80 operates in accordance with a program conventionally resident in read only memory associated with $\mu$C 80. This program is shown in the Microfiche Appendix which is a part of this disclosure. Permission is given to make facsimile reproduction of this Microfiche Appendix from Patent Office files, but all other copyright rights are reserved.

This program is described hereinafter with reference to FIGS. 7A to 7D.

Figure 7A:
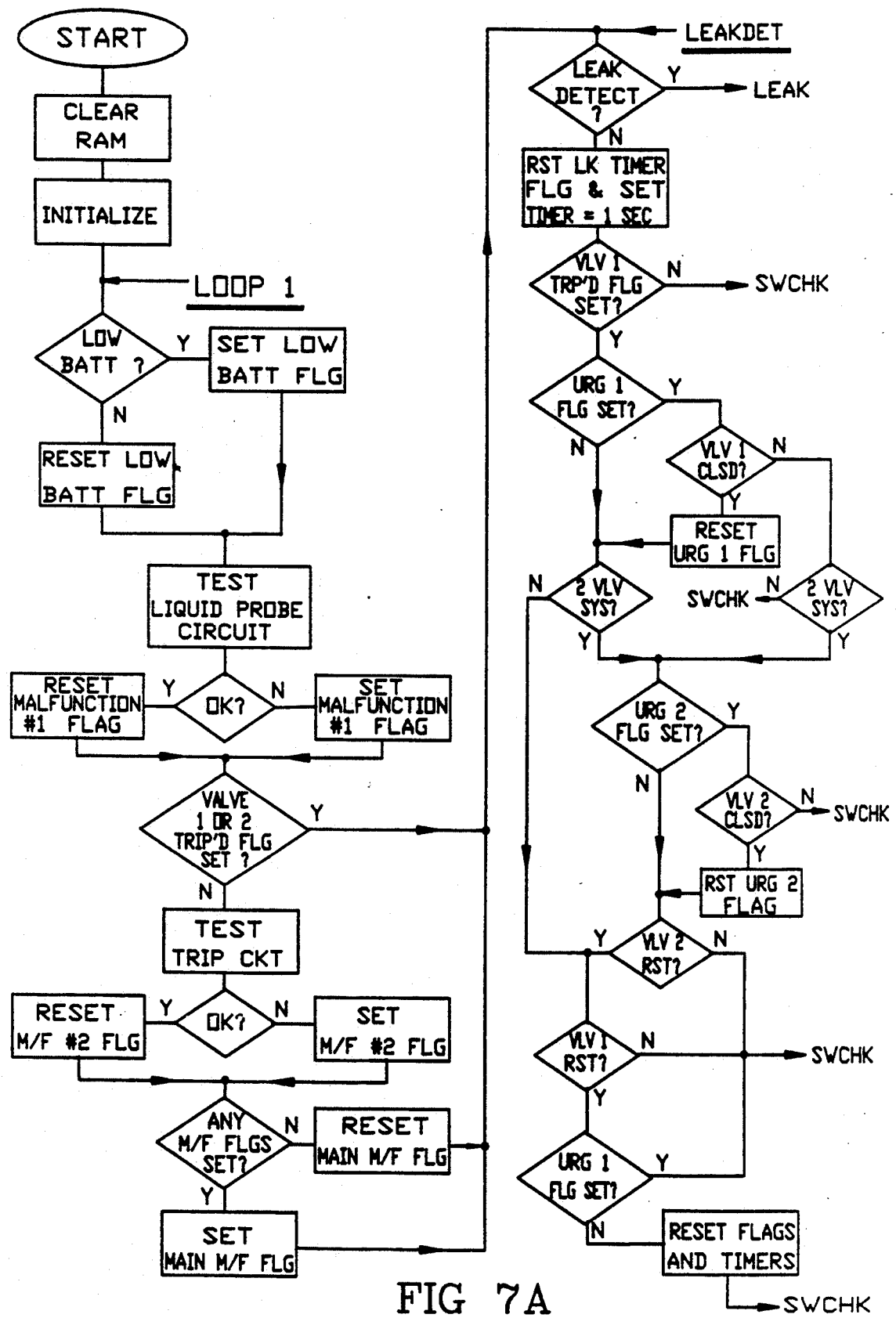
FIGS. 7A through 7D illustrate the logic flowchart for the microcontroller software in accordance with this invention.

Referring to FIG. 7A, the START block represents the point at which power is initially applied to microcontroller 80 (FIG. 6). To avoid repetitive references throughout this portion of the flowchart description, all references to a particular component or components are made to those in FIG. 6. The random access memory (RAM) is next cleared, followed by an initialization of pertinent pointers and counters. The first operation to be performed is the testing for a low battery condition. It will be noted that a reentry point labeled LOOP 1 is provided just prior to the low battery test. Depending on the results of the low battery test the LOW BATT flag may be set or reset. Next, the liquid probe circuit is tested by turning on transistor 107, thus simulating a water-leak condition by placing resistor 108 across probes 18 and 19. The results of this test determine whether MALFUNCTION #1 flag is set or reset. At this point a determination must be made regarding whether shutoff valve number 1 (or additionally shutoff valve 2 if two valve operation is involved) has been tripped to a valve closed condition. If the VALVE TRIPPED flag has been set the program will not perform the trip wire test since those circuits are presumably open as a result of the valve-open condition. If the VALVE TRIPPED flag is not set, a test of the valve trip circuits is made. This is accomplished by checking the voltage at terminal L7 (and L5 for 2-valve operation) to verify that a positive voltage is present. The absence of a positive voltage indicates an open circuit which could occur if, for example, a BioMetal TM wire 66 had become broken. The malfunction, M/F TM 2, flag is set or reset depending on the results of the trip circuit test. If either or both of the above malfunction flags are set, the MAIN M/F flag is set, otherwise it is reset and the program proceeds to the leak detect test. To perform this test, transistor 134 is turned on (as previously described) to place a voltage across probes 18 and 19, and the status of terminal G3 on $\mu$C 80 is checked. If a fluid leak is detected, terminal G3 is low and the program proceeds to the LEAK entry point in FIG. 7B. If no leak is detected, the LK TIMER flag is reset and the leak timer is set to one second.

Figure 7B:
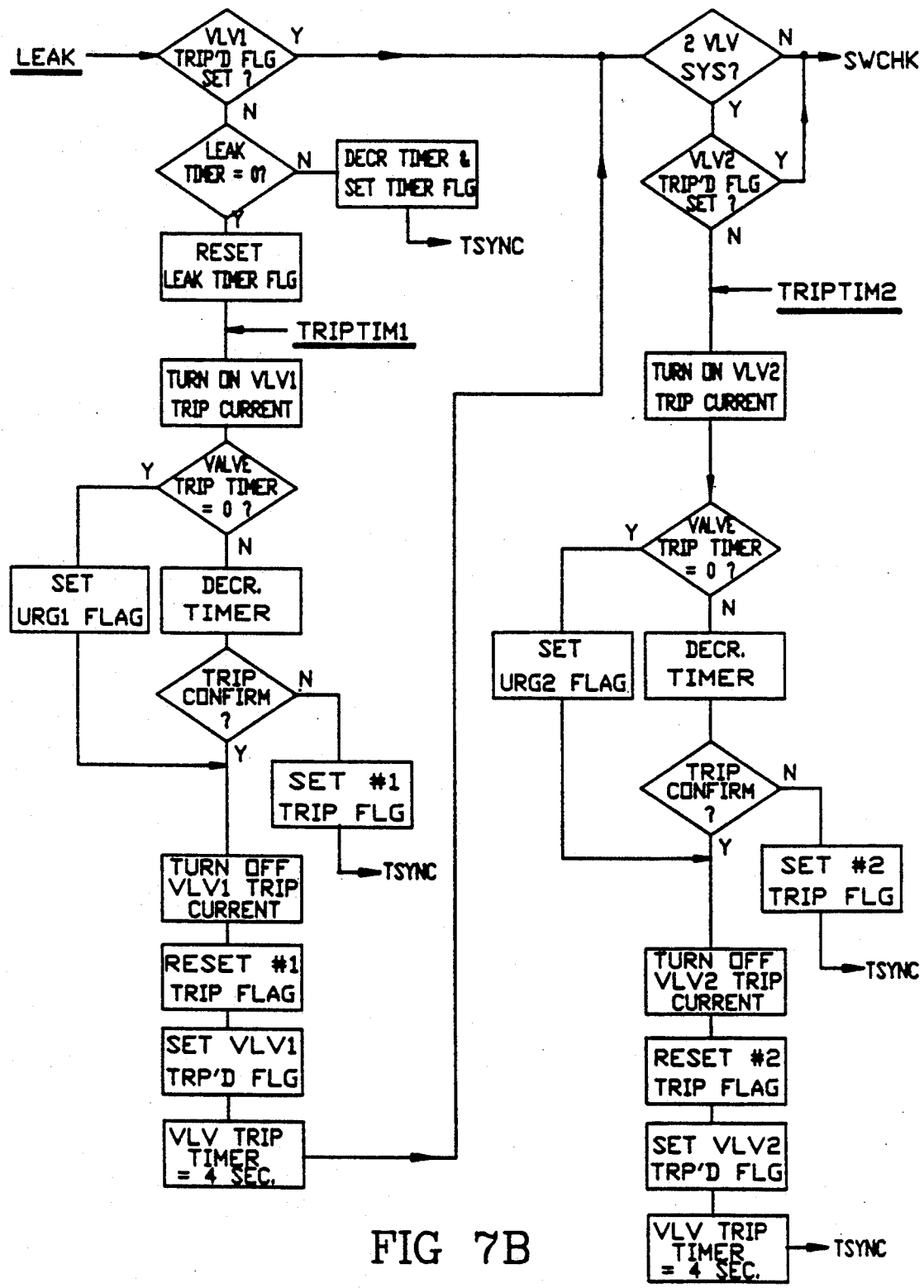
Figure 7C:
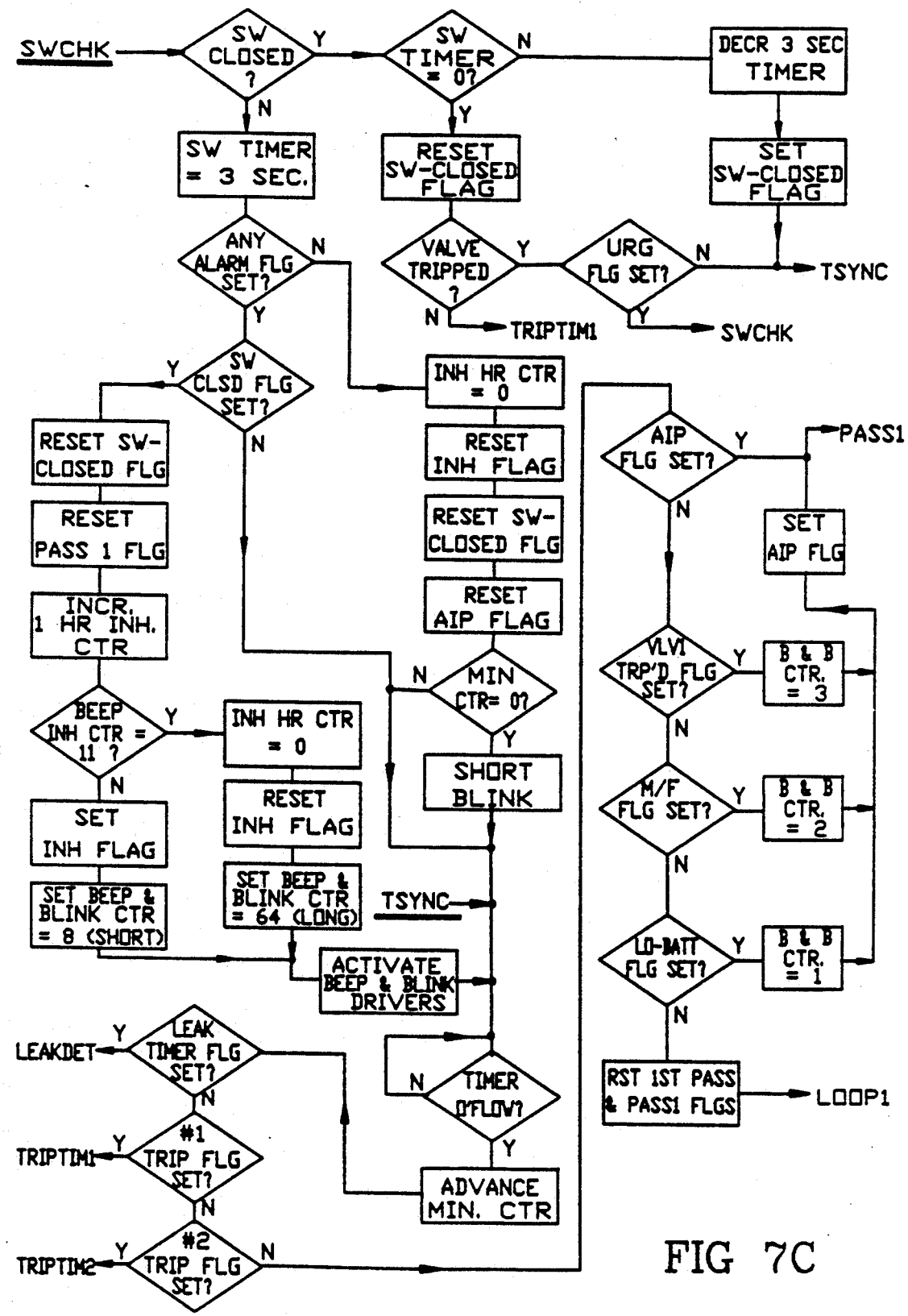

Next, it is necessary to determine if the VLV 1 TRP'D flag is set and if not, the program jumps to the SWCHK entry point (FIG. 7C). If the flag has been set, a check is made of the urgent flag, URG 1, which, if set, indicates that valve 1 has not properly closed and the valve status is now retested to determine if it has indeed closed. If valve 1 has not closed, a test is made to determine if this is a two valve system, and, if not, the program jumps to the SWCHK entry point (FIG. 7C). If it is a two valve system the program proceeds to check if the urgent flag, URG 2, is set. If it is set and valve 2 is open, the program jumps to the SWCHK entry point (FIG. 7C). If the valve is now closed the URG 2 flag is reset. Returning to the VLV 1 CLSD? test block, if it was determined that valve 1 is now closed, the URG 1 flag is reset and another two valve system test is made in this branch of the program (2 VLV SYS? block). If it is not a two valve system the program proceeds to the VLV 1 RST? block where a test is made to determine if valve 1 has been reset to an open-valve condition. If it has, the next test is whether the URG 1 flag is set and if the flag is not set the program resets all pertinent flags and timers to restore a normal valve-closed condition. In the last three test blocks just described, there are three commonly connected outputs which result in a program jump to the SWCHK entry point (FIG. 7C).

FIG. 7B pertains primarily to the action taken by the program to trip the valve latch mechanism(s) as a result of a fluid leak detection or a test valve closure request resulting from switch 12 being held closed for more than three seconds. At the LEAK entry point of FIG. 7B, the VLV1 TRIP'D flag is tested to determine if the valve 1 closure routine has been completed. If the VLVI TRIP'D flag is set, the program next determines if this is a one or two valve system. If it is a one valve system, the program proceeds to the entry point SWCHK (FIG. 7C). If it is a two valve system, a test is made to determine if the valve 2 closure routine has been completed and, if it has, also proceeds to the entry point SWCHK (FIG. 7C). Returning to the 'N' output of the VLV1 TRIP'D FLG SET? block, a test is next made to determine whether the leak timer has counted down to zero. The purpose of the leak timer is to require that a leak condition exist for at least 1 second before initiating a valve closure routine, thus reducing the possibility of erroneous valve closure. If the timer has not counted down to zero, the timer value is decremented and the LEAK TIMER flag set, then the program jumps to the TSYNC entry point (FIG. 7C) which causes the program to loop in a manner such that the leak timer is continued to be decremented toward zero as long as a fluid leak condition exists. A more complete explanation of the TSYNC routine is provided in conjunction with the discussion of FIG. 7C. For now, if it is assumed that the leak timer has reached a zero count, the LEAK TIMER flag is reset and the micro-controller 80 turns on the driver circuits, as previously described, to activate the valve trip mechanism. A test is now made to determine if the VALVE TRIP TIMER equals zero and, if not, the timer is decremented. Next, terminal L7 of $\mu$C 80 is tested to see if the voltage at that point has dropped to zero, indicating that valve 1 closure has been completed and, if it has not, the #1 TRIP flag is set. The program now jumps to TSYNC (FIG. 7C) which causes the program to continuously loop back to the TRIPTIM1 entry point until either a valve trip confirmation is obtained or the valve trip timer has decremented to zero, which would occur after 4 seconds duration. If the valve trip timer does reach zero it would indicate a possible jammed valve condition, in which case the URG1 flag is set, to initiate an urgent alarm mode. In either case, the valve 1 trip current is turned off, the #1 TRIP flag is reset, the VLV1 TRP'D flag is set, and the valve trip timer is set to four seconds. The program now tests to determine if this is a one or two valve system as described earlier. It can be seen that the remainder of the FIG. 7B flowchart is essentially a duplication of the just described valve 1 trip function, with the exception that it pertains to valve 2.

FIG. 7C begins with the SWCHK entry point where the first decision is whether switch 12 is closed. If it is closed, the switch timer is next checked to see if it is zero, indicating that switch 12 has been held closed for a total of three seconds. If it has not, the three second timer is decremented and the SW-CLOSED flag is set, then the program jumps to TSYNC. Assuming for example that it is desired to initiate a valve trip condition by holding switch 12 closed for three seconds, the switch timer is decremented to zero. At this point the SW-CLOSED flag is reset and a test is made to determine if valve 1 has tripped. If it has not tripped, the program jumps to the TRIPTIM1 entry point (FIG. 7B) where it initiates the valve 1 trip routine. If switch 12 is still closed when the program returns from tripping valve 1 (and valve 2 if required) the next test is to determine if the URG flag is set and, if not, a jump is made to TSYNC. If the URG flag is set, the program jumps to SWCHK and cycles through the resulting very short loop until switch 12 is opened. Once switch 12 opens the switch timer is set to three seconds. The program can reach this point under any one of three conditions, namely, a non-alarm mode, an intentional valve trip mode (switch 12 held closed for 3 seconds), or a standard alarm mode. If a non-alarm mode exists there are no ALARM flags set and the program sets the ALARM INHIBIT HOUR counter to zero, reset the INH, SW-CLOSED, and AIP flags.

The next test involves checking the MIN CTR to see if it has reached a zero count. The minute counter (MIN CTR) only functions to enable the short blink routine to momentarily turn on the LED 9 once each minute, thus providing an indication that the system is functioning normally. TSYNC represents a central program entry point in that a $\mu$C 80 internal counter is used to establish a one quarter second program cycle time. To accomplish this, the internal counter, which is continuously incrementing, is now tested to determine if it has reached its maximum, overflow count. If it has not overflowed the program continues to loop back to the TSYNC point until an overflow condition is reached. Next, the internal counter is preset to a value which produces another overflow one-quarter second later. Then the program exits that loop and advances the MINUTE counter.

Before proceeding to the LEAK TIMER flag test, it is necessary to return to the ANY ALARM FLG SET? block. If the ALARM FLG was set, and the SW CLSD flag is not set, the program once again proceeds to the TSYNC entry point. If, however, the SW CLSD flag is set, it indicates that switch 12 was momentarily closed and, since an alarm flag is set, a request is being made to inhibit the visible and audible alarms and add an hour delay before they are reinstated. In this program path the SW-CLOSED and PASS 1 flags are reset and the one hour inhibit counter (1 HR INH CTR) is incremented.

Since an arbitrary limit of ten hours has been set on the alarm inhibit delay, a test is now made to determine if that limit has been exceeded. If the inhibit counter does not equal eleven, the INH flag is set and the BEEP & BLINK counter is set to eight, which represents a short beep from the piezoelectric transducer 103 and a short blink from LED 9. Had the INHIBIT counter equaled eleven, the INH HR counter would be set to zero, the INH flag would be reset and the BEEP & BLINK counter would be set to 64 representing a longer beep and blink. In either case the beep and blink drivers are now activated and the program returns to TSYNC. Returning now to the LEAK TIMER FLG SET? block it can be seen that once the LEAK TIMER flag had been set (FIG. 7B), the program will loop to the LEAKDET entry point (FIG. 7A) until the leak timer reaches a zero count at which time a valve closure routine will be initiated. The next two decision blocks, namely, #1 TRIP FLG SET? and TM 2 TRIP FLG SET? are used during the respective valve closure routines to lock the program into those routines until the valve closure is complete or the urgent alarm flags have been set.

Once the program exits the TM 2 TRIP FLG SET? block the AIP (Alarm In Progress) flag is checked. If it is not set, the next three decision blocks are used to determine what number should be placed in the BEEP & BLINK counter. For example, if the VLV1 TRP'D flag is set, the BEEP & BLINK counter is set to three. The three decision blocks are arranged in their order of priority. If none of the indicated flags are set, the 1ST PASS and PASS1 flags are reset and the program jumps to LOOP1. If any of the indicated flags are set, the appropriate count is placed in the BEEP & BLINK counter, and the AIP flag is set to force the program to bypass any future setting of the BEEP & BLINK counter until the AIP flag is reset. The program now jumps to PASS1 on FIG. 7D.

Figure 7D:
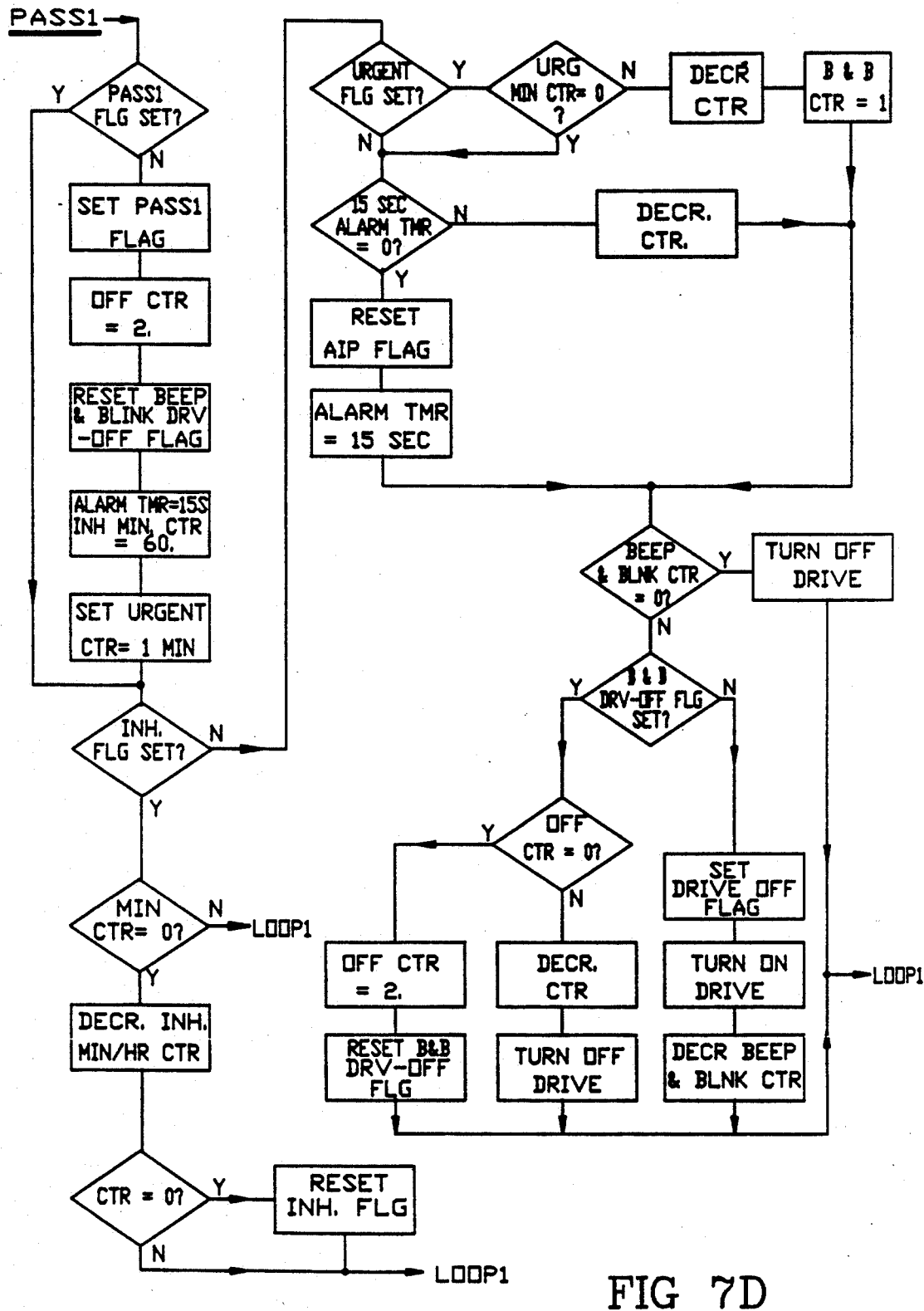

FIG. 7D shows the program routines used to turn on and off the LED 9 and piezoelectric transducer 103 according to the particular alarm requirements. The first decision that is made at the PASS1 entry point is whether or not the PASS1 flag is set. Assuming the flag is not set, there are several initiating tasks that are performed during the first pass through this program alarm section. As indicated on the flowchart these tasks range from setting the PASS1 flag to setting the URGENT COUNTER to one minute. Once the PASS1 flag is set, any future passes will bypass this initialization loop until all the alarm flags are no longer set as indicated at the last step of FIG. 7C.

Proceeding on at the INH. FLG SET? block, the inhibit flag is checked and, if set, the program enters its alarm inhibit loop. As previously described, restoration of the visible and audible alarm transducers can be delayed in one hour increments. Once the INHIBIT flag is set, the system minute counter is tested to see if it has decremented to zero and, if not, the program returns to the LOOP1 entry point on FIG. 7A. If the system minute counter is zero the INH. MIN/HR will be decremented. After sixty decrements of the minute portion of the INH. MIN/HR counter, the HOUR counter will decrement. If, for example, the INHIBIT HOUR counter had been set to one hour, the first decrement of this counter after an elapsed one hour period would result in the INHIBIT flag being reset.

Referring again to the INH. FLG SET? block, it can be seen that the program would now proceed to the URGENT FLG SET? block. Assuming that the URGENT flag is not set, the 15 SECOND ALARM TIMER is tested. As previously described, the coded alarm sequence is repeated every 15 seconds until the particular problem which causes the alarm is solved, or the alarm is inhibited. If the 15 SECOND ALARM COUNTER has not reached a zero count, it is decremented. Next, the BEEP & BLINK counter is tested and if, for example, the counter is now at three (representing a leak detection alarm) the BEEP & BLINK DRIVE-OFF flag is tested. Since initially this flag is not set, the program sets the flag, then turns on the drive to the LED 9 and the piezoelectric transducer 103. Next it decrements the BEEP & BLINK counter and finally exits to the LOOP1 entry point on FIG. 7A. With the BEEP & BLINK DRIVE-OFF flag now set it can be seen that the OFF counter is tested for a zero count. At this point the counter is not zero so it is decremented and the beep and blink drive are turned off.

The next program pass again decrements the OFF counter such that on the next pass the OFF counter is set to two and the B & B DRV-OFF flag is reset. From the above discussion it is seen that the beep and blink transducers are turned on for one program loop period then off for three periods. This sequence repeats until the BEEP & BLINK counter equals zero, at which time the beep and blink drive is turned off. When fifteen seconds have elapsed the AIP flag is reset and the ALARM TIMER is set to 15 seconds, thus allowing the BEEP & BLINK counter to be set to its appropriate alarm number (FIG. 7C). Finally, if the URGENT flag is set, the BEEP & BLINK counter are repetitively set to one for a one minute period, then the alarm sequence reverts to the standard 15 second period.

The foregoing describes a latched, spring-loaded ball valve with an associated electronic control module and leak detector module to provide a leak detection and shutoff valve system. It is understood that another spring-loaded valve such as a slide valve could be substituted. The primary advantage in using a latched valve is that it requires no holding power once it has been tripped to a closed position. Another advantage is that it requires no fluid flow through the valve or pressure differential across the valve to activate its closure mechanism, as is the case with certain hydraulically or pneumatically activated valves. It should also be recognized that, although the described valve utilizes a BioMetal TM wire to activate the unlatching mechanism, a device such as a solenoid could also be used. In addition, a manual means of activating the unlatching mechanism could be provided. While the control module and AC adapter have been described as two separate units, it should be recognized that, with the appropriate modification, the AC adapter could be made an integral part of the control module. In addition, the LED and piezoelectric transducers can, with the appropriate modification, be removed from the control module or duplicated in a manner to provide a remote alarm indicator.

Last, the described automatic shutoff valve has pertained to applications involving water leaks. It should also be recognized that the leak detection module 17 could be replaced by a switching device actuated by a natural gas and/or seismographic detector. In this way the shutoff valve, when installed in a natural gas or propane supply line, would be tripped to turn off the flow of gas in the event of a detected gas leak or earthquake of a predetermined magnitude. The use of the 4-wire cable 16 would still be applicable in this case since it would provide the same means of monitoring the wiring integrity between any of the above detector systems and the control module 7.

The description of the invention is illustrative and not limiting; further modifications will be apparent to one skilled in the art, in the light of this disclosure and the appended claims.

I claim:

1. A method of operating a battery powered leak prevention valve actuated by a trip circuit and having a moisture sensor and a switch for detecting that the valve is closed, comprising the steps of:
    testing the battery for a low voltage condition and providing an indication of the low voltage condition;
    testing the moisture sensor periodically by switching a predetermined resistance across two sensing conductors of the moisture sensor, and providing an indication of an absence of a detected current between terminals of the conductors;
    testing the trip circuit by sensing a predetermined voltage present at a particular terminal of the trip circuit, and if the predetermined voltage is not sensed, providing an indication;
    performing a leak detection test by sensing a predetermined current between the terminals of the moisture sensor for at least a predetermined period of time;
    providing an alarm if the predetermined current is sensed; and
    if a leak is detected, testing that the valve is in a closed position, by detecting a position of the switch, and if the valve is not closed, activating the trip circuit to close the valve.

2. The method of claim 1, further comprising the step of providing the alarm in response to operation of an alarm delay switch.

3. The method of claim 1, further comprising the step of providing a second trip circuit and a second valve.

4. The method of claim 1, further comprising the step of providing a second moisture sensor.

5. The method of claim 1, further comprising the step of communicating data from the moisture sensor to the valve by an AC power line.

6. The method of claim 1 wherein the step of performing a leak detection test comprises the steps of applying a voltage to the terminals of the conductors and causing a current to flow through the entire length of both the sensing conductors.

7. An automatic shutoff valve comprising:
    a latch operated valve having an open position and a closed position;
    a sensor for detecting an electrical current level between two terminals thereof;
    a switch for detecting that the latch of the valve is in a position wherein the valve is closed;
    a control circuit for applying a voltage between the two terminals of the sensor at predetermined intervals and operating the valve in response to a particular detected electrical current level;
    a battery for powering the control circuit;
    wherein at a second predetermined interval the control circuit tests the sensor by switching an electrical resistance between the two terminals of the sensor and measures the resulting electrical current level, and provides an indication if the resulting electrical level current is other than a predetermined value, and wherein after the valve has been operated by the control circuit to close the valve, the control circuit determines that the valve is in the closed position by determining a condition of the switch, and if the switch does not detect that the valve is in the closed position, providing an indication thereof.

8. The device of claim 7, wherein the control circuit also controls operation of a second valve.

9. The device of claim 7, further comprising an alarm actuated by the control circuit when the valve is operated by the control circuit, and further comprising a user switch for delaying activation of the alarm by a predetermined time for each activation of the user switch.

10. The device of claim 7, further comprising a second sensor connected to the control circuit, the second sensor being electrically connected in parallel to the first sensor.

11. The device of claim 7, wherein the sensor is a remote unit communicating with the control circuit by an AC power line.

12. The device of claim 7, wherein the control circuit only operates the valve when the particular detected current level is present for a predetermined period of time.

13. The device of claim 7, wherein the sensor comprises:
    a first conductor and a second conductor, a first end of the first and second conductors each connected respectively to one of the terminals; and
    a switch connected between the second ends of both the first and second conductor.

14. The device of claim 13, wherein both the first conductor and the second conductor each include a series connected jumper disposed between the first end and the second end of the conductor.

* * * * *